(12) United States Patent  
Klein et al.

(10) Patent No.: US 12,253,270 B2
(45) Date of Patent: Mar. 18, 2025

(54) AIR CONDITIONER

(71) Applicant: TRUMA GERAETETECHNIK GMBH & CO. KG, Putzbrunn (DE)

(72) Inventors: Michael Klein, Putzbrunn (DE); Wolfgang Muselmann, Putzbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 184 days.

(21) Appl. No.: 18/038,503

(22) PCT Filed: Oct. 25, 2021

(86) PCT No.: PCT/EP2021/000132
§ 371 (c)(1),
(2) Date: May 24, 2023

(87) PCT Pub. No.: WO2022/111844
PCT Pub. Date: Jun. 2, 2022

(65) Prior Publication Data
US 2024/0019133 A1  Jan. 18, 2024

(30) Foreign Application Priority Data
Nov. 30, 2020 (DE) .......................... 102020007289.5

(51) Int. Cl.
*F24F 1/10* (2011.01)
(52) U.S. Cl.
CPC ..................................... *F24F 1/10* (2013.01)

(58) Field of Classification Search
CPC ...... F24F 1/10; B60H 1/3223; B60H 1/00521
See application file for complete search history.

(56) References Cited

U.S. PATENT DOCUMENTS

| | | | |
|---|---|---|---|
| 5,306,121 A * | 4/1994 | Heflin | F16F 15/08 417/363 |
| 6,260,373 B1 * | 7/2001 | Rockwood | F16F 7/104 165/69 |
| 6,354,558 B1 * | 3/2002 | Li | F16F 1/3732 248/673 |
| 6,499,714 B1 * | 12/2002 | Wike | F16B 5/0258 248/634 |
| 7,263,851 B2 * | 9/2007 | Yun | F25D 23/006 181/207 |

(Continued)

FOREIGN PATENT DOCUMENTS

| | | |
|---|---|---|
| EP | 3358264 B1 | 2/2020 |
| JP | 2019007448 A | 1/2019 |

(Continued)

*Primary Examiner* — Lionel Nouketcha
(74) *Attorney, Agent, or Firm* — McNees Wallace & Nurick LLC

(57) ABSTRACT

Example embodiment relate to an air conditioner. A fastening device fastens a compressor on a bottom of a housing via a mounting component. A clamping element is arranged within a guiding element. The guiding element is arranged in a recess of the bottom of the housing and has a smaller length than the recess. Two stop elements are each associated with a front side of the clamping element, an axial distance between the stop elements being variable in the unassembled state and being fixed in an assembled state.

10 Claims, 2 Drawing Sheets

(56) References Cited

U.S. PATENT DOCUMENTS

| | | | |
|---|---|---|---|
| 7,814,760 B2 * | 10/2010 | Immel | H05K 7/20172 415/140 |
| 2008/0314072 A1 | 12/2008 | Plank et al. | |
| 2010/0006257 A1 | 1/2010 | Shutz | |

FOREIGN PATENT DOCUMENTS

| | | |
|---|---|---|
| KR | 1020150127913 A | 3/2017 |
| WO | 2007042065 A1 | 4/2007 |
| WO | 2008040340 A1 | 4/2008 |

* cited by examiner

AIR CONDITIONER

FIELD OF DISCLOSURE

Example embodiments relate to an air conditioner for cooling a room. In one variant, this involves an air conditioner to be fastened onto the roof of a vehicle (of a mobile home or a caravan, for example).

The principle of cold production by means of a cooling circuit on which air cooling is based has been known for a long time and is for example described in document WO 2007/042065 A1. In most cases, two fans and two heat exchangers are provided in such air-conditioning systems. A fan and an associated heat exchanger belong to the evaporator in which the air of the room to be cooled is cooled by interaction with the refrigerant. A further fan and an associated heat exchanger belong to the condenser in which thermal energy of the refrigerant is transferred to ambient air and is thus dissipated.

It has been shown that the compressors (alterative designation is superchargers) used in air conditioners can generate noises. The compressors are for example mounted in polyurethane molded parts (cf. WO 2007/042065 A1). The noises are in most cases attributable to the fact that the compressor generates forces which are transmitted to the outside and in particular to the points where the compressor is connected to the housing.

Therefore, the object on which the disclosure is based is to propose an air conditioner having reduced noise.

SUMMARY

Example embodiments achieve the object by means of an air conditioner. The air conditioner has a housing, a compressor and at least one fastening device for the compressor in the housing, the compressor having at least one mounting component, the mounting component and the fastening device being configured and connected to each other such that the compressor is fastened on a bottom of the housing, the fastening device having at least one clamping element, a guiding element and two stop elements, the guiding element being arranged in a recess of the bottom of the housing, a length of the guiding element being shorter than a height of the recess, the stop elements being each associated with a front side of the clamping element, an axial distance between the stop elements being variable in an unassembled state, and an axial distance between the stop elements being fixed in an assembled state.

In the air conditioner according to the invention (an alternative designation is for example air-conditioning system), a compressor is located in a housing and fastened to the bottom of the housing by means of a fastening device. The compressor is located on the inner side of the bottom, and the housing is located, for example, onto the roof of a caravan via the exterior side of the bottom. The fastening produces a mechanical coupling between the compressor and the housing. This causes the transmission of vibrations of the compressor directly onto the housing and in particular the bottom of the housing. The mounting component of the compressor is for example a foot area or a section of the compressor which is guided to the outside. The compressor thus rests on the mounting component or at least transmits vibrational energy thereto.

The fastening device has a clamping element, a guiding element and two stop elements. In one configuration, a plurality of fastening devices is provided. For the components of the fastening device, a distinction between an assembled and an unassembled state is to be made. The unassembled state may also be referred to as a state during assembly or prior to the assembled state. During assembly, the components are joined to the compressor and the housing such that the compressor is coupled to the bottom of the housing. The guiding element is arranged in a recess of the housing bottom. The bottom thus has a recess, for example a through-hole in which the guiding element (in one configuration a kind of sleeve) is inserted. In one configuration, the clamping element has a cylindrical shape and is for example a kind of pin or screw. The length of the guiding element is shorter than a height of the recess. Therefore, there is an undersize of the guiding element with respect to the recess in which it is inserted. The two stop elements are each associated with a front side of the clamping element. In other words: the stop elements are arranged at the top and at the bottom with respect to the clamping element and thus permit the fixing of those components which are located axially along the clamping element. An axial distance between the stop elements is variable in the unassembled state and fixed in an assembled state. Therefore, the axial distance between the two stop elements is modified during assembly, for example, so as to produce an attachment or to set a distance between components of the fastening device, for example. In one configuration, these are in particular components through which the clamping element is passed during assembly and which are thus then located radially around the clamping element.

According to one configuration, a plurality of fastening devices is provided which are each separately connected to the bottom of the housing. Each fastening device thus individually and independently of the other introduces the compressor forces into the bottom. The vibrations are thus further distributed and reduced to a greater extent.

One configuration provides that the clamping element and the guiding element are configured and adapted to each other such that in an unassembled state, the clamping element is arranged so as to be axially movable within the guiding element. In this configuration, the clamping element can thus be moved axially within the guiding element in the unassembled state. This is for example an alternative to a configuration in which the guiding element is part of the clamping element and thus integrally formed therewith, for example.

One configuration consists in that the fastening device has two supporting rings, that the two supporting rings are located at different heights along the clamping element, that the guiding element is located axially along the clamping element between the two supporting rings, and that in the assembled state, the two supporting rings are in contact with the bottom of the housing and in contact with the guiding element. In this configuration, two supporting rings are provided the function of which is similar to that of the stop elements and which define an axial distance or exert a force onto components. The guiding element is arranged between the two supporting rings and is thus framed by the latter in the axial direction. In the assembled state, the supporting rings are in contact with the bottom of the housing. Therefore, one supporting ring is located on the exterior side and one supporting ring is located on the interior side of the housing. The outer supporting ring is associated with a stop element which is thus also located outside the housing. In one configuration, the outer stop element is located axially in front of or further outside than the outer supporting ring. Thus, in the axial direction (from outside to inside), the stop element comes first, then a separate supporting ring, then the guiding element, and finally the other supporting ring.

Further, the supporting rings are in mechanical contact with the guiding element. As there is an undersize of the guiding element relative to the recess of the bottom in which it is arranged, a force is exerted onto the bottom in the area of the recess. In one configuration, this results in a deformation of the bottom in this area.

One configuration provides that the fastening device has at least one spring unit and that the spring unit is arranged axially along the clamping element between the guiding element and the mounting element. The spring unit is thus located within the housing and above the bottom. The spring unit is a combination of elastic components and a metal spring, for example.

One configuration consists in that in the assembled state, the spring unit is arranged so as to be axially movable between the guiding element and a stop element. The stop element concerned here is that element which is assigned to the front side of the clamping element located in the housing. In this configuration, the spring unit has a clearance relative to the axial distance between the guiding element and the inner stop element and therefore also relative to the mounting component of the compressor. This is in opposition to the fixed distance between the two supporting rings and thus the attachment of the guiding element in the recess in the housing bottom.

One configuration provides that the fastening device has an additional guiding element, that in the unassembled state, the clamping element is axially movable within the additional guiding element, and that the spring unit at least partially radially surrounds the additional guiding element along the clamping element.

One configuration consists in that the guiding element and/or the additional guiding element is/are at least partially configured in a sleeve-like manner. The clamping element, which has a pin shape, for example, is guided through the interior of the sleeve shape.

One configuration provides that one stop element is configured as a nut. This configuration is preferably accompanied by the fact that in the axial area of the stop element, the clamping element has an external thread corresponding with the internal thread of the nut.

One configuration consists in that one stop element is configured as a flange-like end section of the clamping element. In this configuration, the stop element is a broad front side, as is provided as a head for nails, for example.

One configuration provides that at least in the area of the recess, the bottom of the housing is elastically deformable. The bottom preferably has a vibration damping effect.

One configuration consists in that the bottom of the housing is made of foamed plastic material at least in the area of the recess. A foamed plastic material is EPP, for example, which is expanded polypropylene.

More specifically, there are several possibilities to configure and further develop the tempering device according to the invention. To this end, reference is made, on the one hand, to the claims which depend on claim 1, and, on the other hand, to the description below of example embodiments in conjunction with the drawing in which:

BRIEF DESCRIPTION OF EXAMPLE EMBODIMENT

Figure 1:
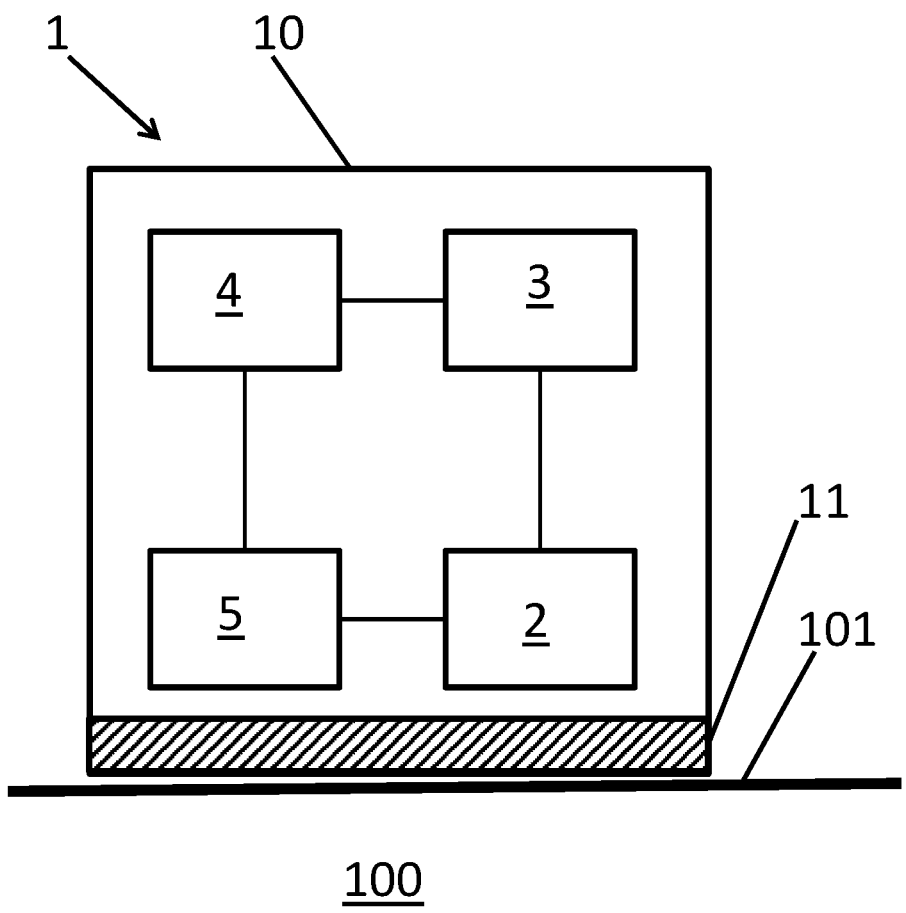
FIG. 1 shows a schematic representation of an air conditioner.

FIG. 1 schematically shows the structure of an air-conditioning system 1 for cooling a room 100 located below a roof 101. The cooling circuit or cooling process thus realized is described in WO 2007/042065 A1, for example. The room 100 is for example the interior space of a caravan or mobile home. For this case of application, the air-conditioning system 1 is fastened onto the vehicle roof 101 of the caravan or mobile home.

For the cooling process, a compressor (an alternative designation is supercharger) 2 compresses a gaseous refrigerant which is thus heated and conveyed to a condenser 3 via a refrigerant line. In the condenser 3, the heat of the refrigerant is transferred to the ambient air (or outside air) from the surroundings around the room 100. The outside air is thus sucked in—by an appropriate fan—and blown out again after interaction with the refrigerant in a heat exchanger. Therefore, this unit 3 can also be referred to as outside air or outdoor heat exchanger. Due to the release of the heat, the compressed refrigerant condenses. The liquid refrigerant which is still under high pressure is expanded to a lower pressure in an expansion means 4 which is configured as a throttle, for example. The refrigerant is thus cooled.

In the next step, the refrigerant reaches an evaporator 5 through which the air of the room 100 to be cooled is guided. The room air transfers its heat to the refrigerant which changes to the gaseous state. The component 5 can thus also be referred to as inside air or indoor heat exchanger. The gaseous refrigerant finally returns to the compressor 2 so that the cooling circuit can be continued.

The circuit described above can be reversed so that the device 1 serves as a room heating. In this case, the condenser 3 described above acts as an evaporator, and conversely, the evaporator 5 serves as a condenser.

The components of the air-conditioning system 1 are arranged in a housing 10 which rests with its bottom 11 onto the roof 101.

Figure 2:
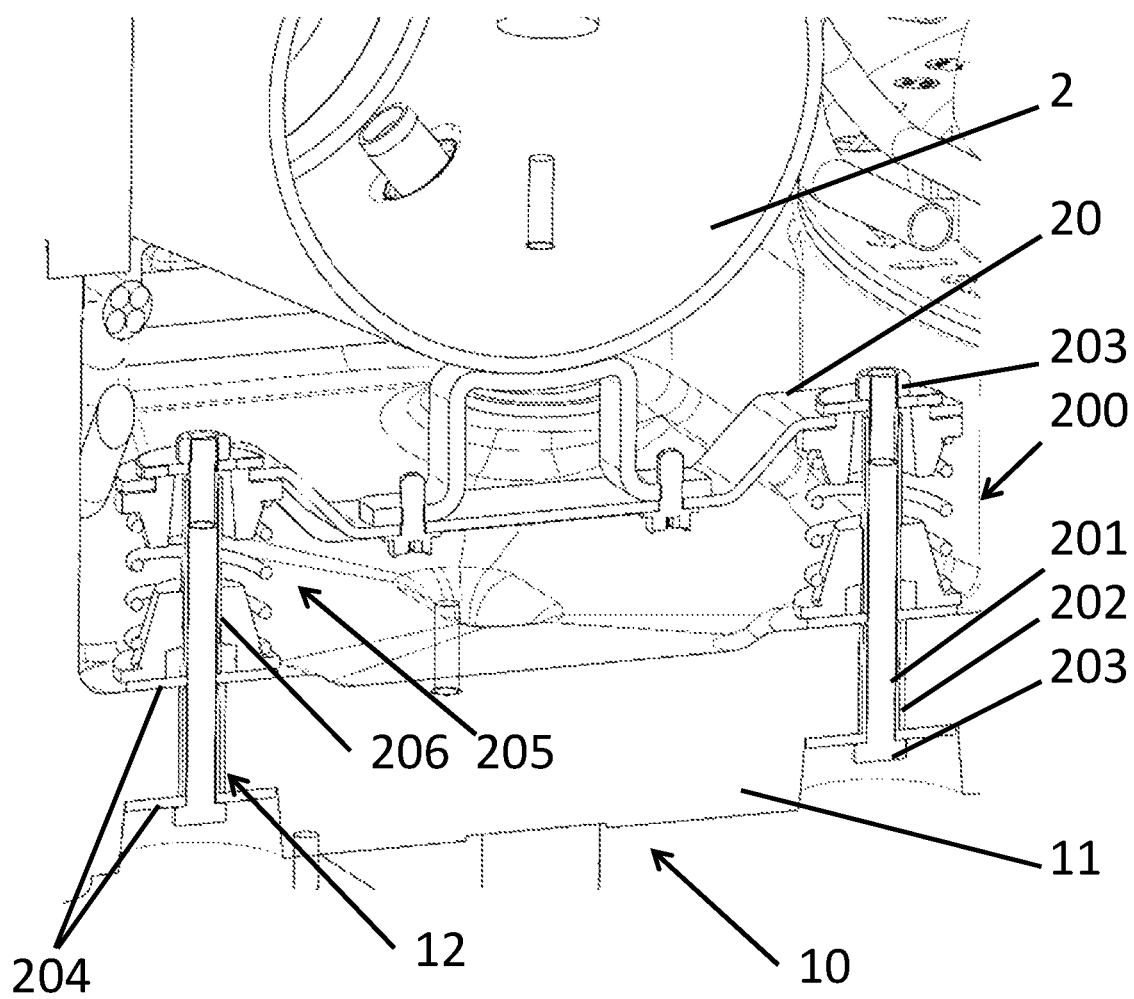
FIG. 2 shows a section of a configuration of an air-conditioning system.

FIG. 2 shows a configuration in which in the assembled state, the compressor 2 is fastened with its mounting component 20 to the bottom 11 of the housing 10 by two fastening devices 200. The mounting component 20 is a kind of metal tab onto which one side of the compressor 2 rests. A further mounting component which is connected to the bottom 11 by a further fastening device—not shown here— is located on the opposite side of the compressor 2—not shown here. The fastening devices 200 shown are here of identical design.

It can be seen that one respective pin-shaped or screw-shaped clamping element 201 extends from the exterior side of the housing bottom 11 through a recess 12 in the bottom 11 up to the mounting component 20 within the housing. The mounting component 20 has a recess through which the clamping element is guided. The clamping element 201 is surrounded by a plurality of components. The components are fastened by the two stop elements 203 arranged on the front sides. The stop elements 203 are, on the one hand, an integral head of the clamping element 201, and, on the other hand, a nut within the housing 10.

The sleeve-shaped guiding element 202 surrounds the lower section of the clamping element 201 and is axially fastened within the recess 12 between two supporting rings 204 (an alternative designation would be backing rings), an outer supporting ring 204 being arranged between the outer stop element 203 and the exterior side of the bottom 11. The guiding element 202 has an undersize relative to the recess 12 so that the supporting rings 204 also generate a clamping between the guiding element 202 and the bottom 11.

Axially in the direction of the interior of the housing 10, the guiding element 202 is followed by a spring unit 205. The spring unit 205 comprises two conically tapering plastic components and a spring located therebetween. The compressor 2 rests on the bottom 11 via the mounting component 20 and damped by the spring unit 205. The spring unit 205 surrounds the clamping element 201, which is directly surrounded by a sleeve-shaped additional guiding element 206. There is a clearance between the inner supporting ring 204 on the interior side of the bottom 11 and the upper stop element 203, which is designed as a nut.

On the whole, the clamping element 201 is thus surrounded along a longitudinal axis by two sleeve-shaped components: the guiding element 202 and the additional guiding element 206.

LIST OF REFERENCE NUMERALS 1 air-conditioner
2 compressor
3 condenser
4 expansion means
5 evaporator
10 housing
11 bottom of the housing
12 recess of the bottom of the housing
20 mounting component
100 room
101 roof
200 fastening device
201 clamping element
202 guiding element
203 stop element
204 supporting ring
205 spring unit
206 additional guiding element

The invention claimed is:

1. An air conditioner, comprising:
a housing, a compressor, and at least one fastening device for the compressor in the housing, wherein:
the compressor has at least one mounting component,
the at least one mounting component and the at least one fastening device are configured and connected to each other such that the compressor is fastened on a bottom of the housing,
the at least one fastening device has at least one clamping element, a guiding element and two stop elements,
the guiding element is arranged in a recess of the bottom of the housing,
a length of the guiding element is shorter than a height of the recess,
the two stop elements are each associated with a front side of the at least one clamping element,
an axial distance between the two stop elements is variable in an unassembled state, and
an axial distance between the two stop elements is fixed in an assembled state.

2. The air conditioner according to claim 1, wherein the at least one clamping element and the guiding element are arranged so as to be axially movable within the guiding element in the unassembled state.

3. The air conditioner according to claim 1, wherein the at least one fastening device has two supporting rings, the two supporting rings are located on different heights along the at least one clamping element,
the guiding element is located axially along the at least one clamping element between the two supporting rings, and
the two supporting rings are in contact with the bottom of the housing and in contact with the guiding element in the assembled state.

4. The air conditioner according to claim 1, wherein the at least one fastening device has at least one spring unit, and
the at least one spring unit is arranged axially along the at least one clamping element between the guiding element and the at least one mounting component.

5. The air conditioner according to claim 4, wherein the spring unit is arranged so as to be axially movable between the guiding element and at least one of the two a stop elements in the assembled state.

6. The air conditioner according to claim 1, wherein the at least one fastening device includes an additional guiding element,
the at least one clamping element is axially movable within the additional guiding element in the unassembled state, and
the spring unit at least partially radially surrounds the additional guiding element along the at least one clamping element.

7. The air conditioner according to claim 6, wherein the guiding element and/or the additional guiding element are configured at least partially in a sleeve.

8. The air conditioner according to claim 1, wherein at least one of the two stop elements is a nut.

9. The air conditioner according to claim 1, wherein at least one of the two stop elements is configured as a flange end section of the at least one clamping element.

10. The air conditioner according to claim 1, wherein the bottom of the housing is elastically deformable at least in an area of the recess.

* * * * *